United States Patent
Satake et al.

[11] Patent Number: 5,236,633
[45] Date of Patent: Aug. 17, 1993

[54] PLATE AND SHEET COMPRISING NEAR INFRARED ABSORBING COMPOSITION

[75] Inventors: Toshimi Satake; Tomoaki Nagai; Miyuki Yokoyama, all of Tokyo, Japan

[73] Assignee: Jujo Paper Co., Ltd., Tokyo, Japan

[21] Appl. No.: 932,730

[22] Filed: Aug. 24, 1992

Related U.S. Application Data

[63] Continuation of Ser. No. 611,043, Nov. 9, 1990, abandoned, which is a continuation-in-part of Ser. No. 583,198, Sep. 17, 1990, abandoned, which is a continuation-in-part of Ser. No. 363,061, Jun. 8, 1989, abandoned.

[30] Foreign Application Priority Data

Jun. 13, 1988 [JP] Japan .................. 63-145262
Sep. 16, 1988 [JP] Japan .................. 63-232075

[51] Int. Cl.$^5$ .............. F21V 9/04; G02B 5/20; B22F 7/00; C09D 5/00
[52] U.S. Cl. .................. 252/587; 252/582; 252/584; 106/1.23; 359/350; 359/356
[58] Field of Search .......... 252/582, 587, 588, 589, 252/584; 106/1.23; 430/393, 495, 944, 945; 359/350, 356

[56] References Cited

U.S. PATENT DOCUMENTS

| | | | |
|---|---|---|---|
| 4,138,267 | 2/1979 | Arisato et al. | 106/123 |
| 4,277,556 | 7/1981 | Koboshi et al. | 430/393 |
| 4,758,415 | 7/1988 | Patil | 423/150 |

FOREIGN PATENT DOCUMENTS 1202881 8/1970 United Kingdom .

OTHER PUBLICATIONS

Ray et al., Indian Journal of Chemistry, vol. 15A, (1977), pp. 306–309.
Baranyi et al., Canadian Journal of Chemistry, vol. 54, (1976), pp. 1189–1196.
Wharf et al., Canadian Journal of Chemistry, vol. 54, (1976), pp. 3430–3438.
Neubauer et al., Inorginica Chimica Acta, vol. 126 (1987), pp. 11–17.
Encyclopedia of Polymer Science and Engineering, vol. 6, Wiley Interscience, pp. 312–313, 1986.
Chemical Abstracts, Band 86, Nr. 18, May 2, 1977, Seite 662, Zusammenfassung Nr. 131138z, Columbus, Ohio, US; JP-A-76 141 639 (Mita Industrial Co., Ltd.) Feb. 6, 1975.

Primary Examiner—Robert L. Stoll
Assistant Examiner—Philip Tucker
Attorney, Agent, or Firm—Sherman and Shalloway

[57] ABSTRACT

A plate or a sheet being capable of absorbing near IR-rays, which is prepared by heating both at least a raw material of a transparent polymer and a mixture of a thiourea compound and a copper compound. This invention provides superior optical materials for shielding sunlight thermic rays, better information recording materials and the like.

25 Claims, 1 Drawing Sheet

——— PMMA+diphenylthiourea +Cu-stearate
------ PMMA+Cu-stearate
— — — PMMA+diphenylthiourea

PLATE AND SHEET COMPRISING NEAR INFRARED ABSORBING COMPOSITION

This application is a continuation of application Ser. No. 07/611,043, filed Nov. 9, 1990, now abandoned, which is a continuation-in-part of our commonly assigned, copending application Ser. No. 07/583,198, filed Sep. 17, 1990 now abandoned, which in turn is a continuation-in-part of our co-pending application Ser. No. 07/363,061, filed Jun. 8, 1989 now abandoned.

BACKGROUND OF THE INVENTION

1. File of the Invention

This invention relates to a plate comprising a near infrared absorbing composition (hereinafter referred to as a near IR-absorbing composition) comprising both thiourea compound and at least one copper compound.

2. Prior Art

Recently, near IR-absorbing materials have been researched and developed. They have found a wide use, including light-sensitive materials using a semiconductor laser ray having a near IR-wave length range, etc. as a light source; information-recording materials such as an optical recording disk; optical materials for shielding sunlight thermic rays such as thermic ray cut plate, IR-cut filter, IR-cut film.

As hitherto developed near IR-absorbing materials, there are disclosed a chrome-cobalt complex in Japanese Patent Publication No. 60-42269, a thiolnickel complex in Japanese Laid-Open Patent Application No. 60-21294, an anthraquinone derivative in Japanese Laid-Open Patent Application No. 61-115958, a novel squarylium compound having a maximum absorption in a wave length range of 700-800 nm in Japanese Laid-Open Patent Application No. 61-218551.

Further, there are described a nitroso compound, metal complex thereof, a polymethine dye (cyanine dye), a cobalt-, platinum-, or palladium-complex of thiol, Phthalocyanine dye, triarylmethane dye, immonium dye, diimmonium dye, a naphthoquinone dye, and the like in "Near IR-absorbing dyestuff" (Kagakukogyo, 43, May 1986).

Among the conventional near IR-absorbing materials, the organic materials have the defects that the durability is inferior and the original abilities deteriorate with the change of condition or the lapse of time, particularly the weather resistance is insufficient for the exterior plates. On the contrary, the complex-base materials, which exhibit a good durability, have defects that they are strongly colored owing to the absorption of both visible range and near infrared range, and they have not sufficient transmittance in the visible range whereby their uses are limited. Both materials indicate an absorption peak at a particular wave length and have little absorbency in the range of outside the particular wave length. For an efficient cut of thermic rays from the sunlight rays, it is required that several absorbers are used. It is said that this combination hardly exists taking the absorbency, durability, coloring, costs, etc. into consideration. This use is extremely limited.

SUMMARY OF THE INVENTION

It is the general object of this invention to provide a transparent plate comprising a near IR-absorbing material which has a uniform absorption in an entire near IR-region of 700-2,000 nm, a slight color, and an excellent durability.

The above object has been achieved as follows.

The transparent plate, which is capable of absorbing near IR-ray, is prepared by heating both a raw material of polymer and a mixture of at least one thiourea compound of the following general formula (I) and at least one metal compound selected from the group consisting of copper compound;

wherein $R_1$, $R_2$ and $R_3$ are the same or different, and represent a hydrogen atom, alkyl group, a cycloalkyl group, an aryl group, an aralkyl group, an alkenyl group, a monovalent group selected from the group consisting of penta and hexa heterocyclic groups; in addition each group may have a substituent, and $R_1$ and $R_2$, or $R_2$ and $R_3$ taken together with each other may form a ring.

DETAILED DESCRIPTION OF THE INVENTION

Figure 1:
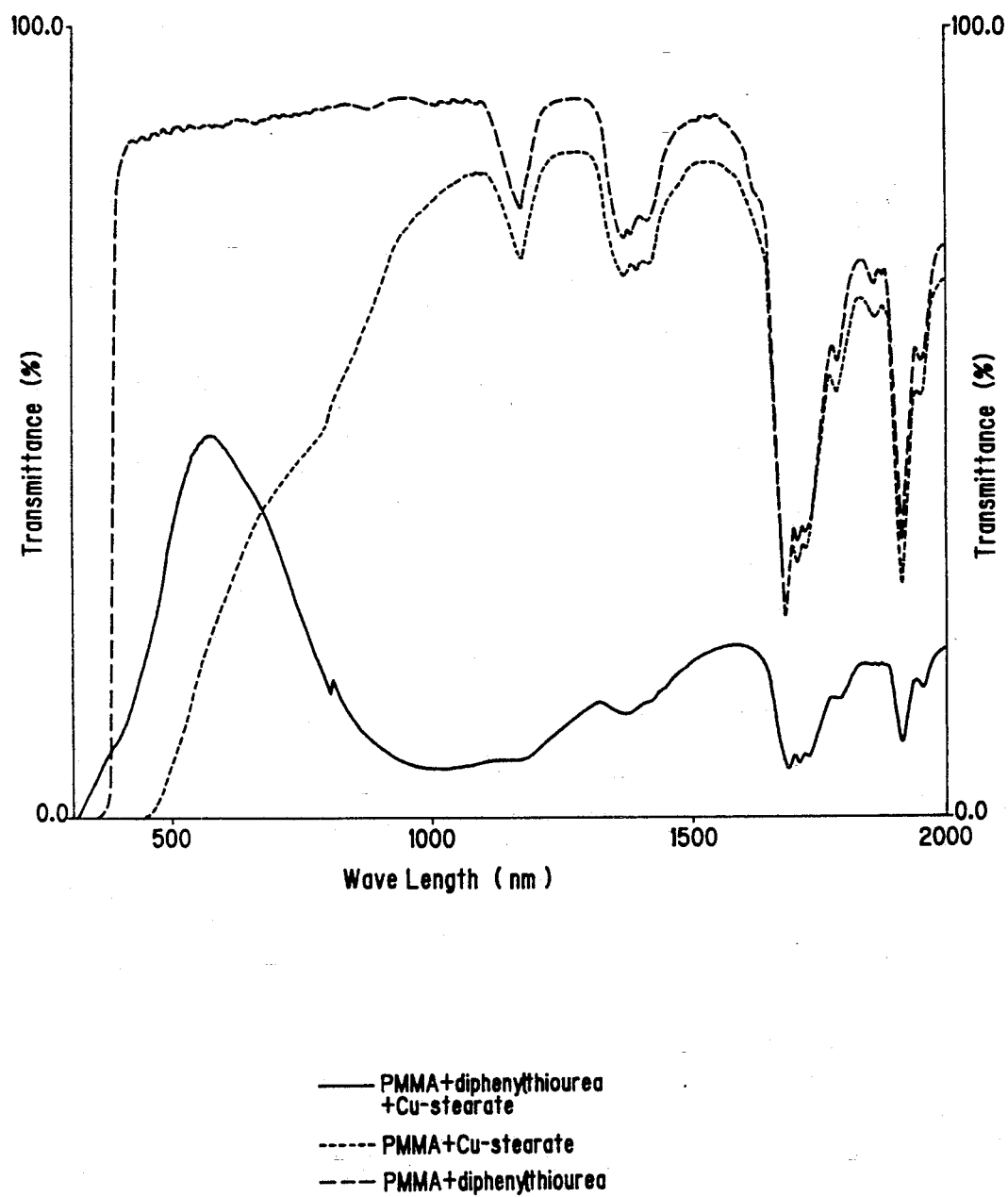
FIG. 1 shows the near IR-reflection spectra for the comparison of a separate heating, and a combined heating, of 1,3-diphenylthiourea and copper stearate.

The thiourea compounds of the general formula (I) used in this invention are not particularly limited and include, for example, the following compounds:

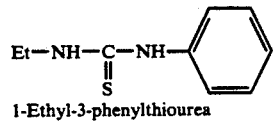
1-Ethyl-3-phenylthiourea

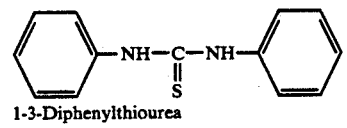
1-3-Diphenylthiourea

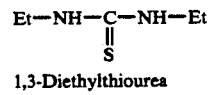
1,3-Diethylthiourea

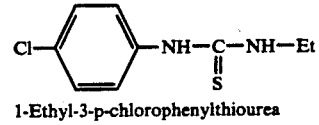
1-Ethyl-3-p-chlorophenylthiourea

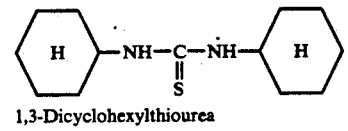
1,3-Dicyclohexylthiourea

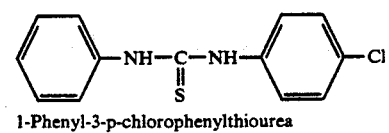
1-Phenyl-3-p-chlorophenylthiourea

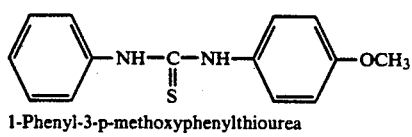
1-Phenyl-3-p-methoxyphenylthiourea

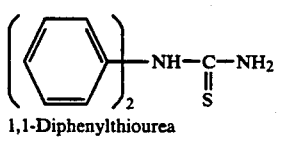
1,1-Diphenylthiourea

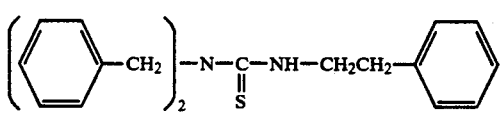
1,1-Dibenzyl-3-phenethylthiourea

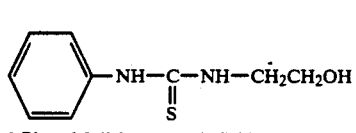
1-Phenyl-3-(2-hydroxyethyl)thiourea

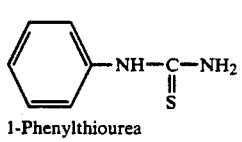
1-Phenylthiourea

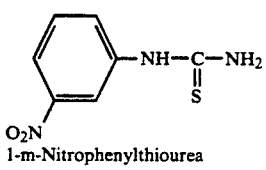
1-m-Nitrophenylthiourea

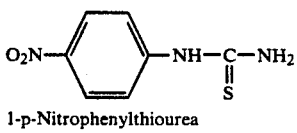
1-p-Nitrophenylthiourea

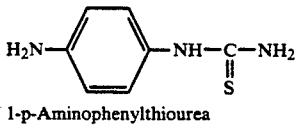
1-p-Aminophenylthiourea

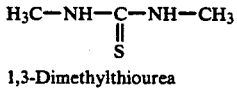
1,3-Dimethylthiourea

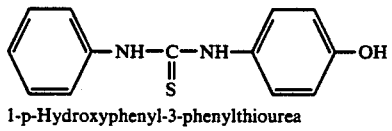
1-p-Hydroxyphenyl-3-phenylthiourea

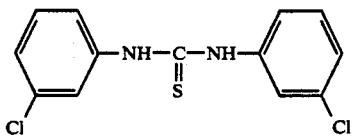
1,3-Di-m-chlorophenylthiourea

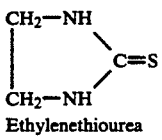
Ethylenethiourea

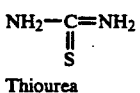
Thiourea

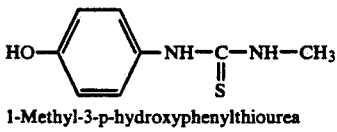
1-Methyl-3-p-hydroxyphenylthiourea

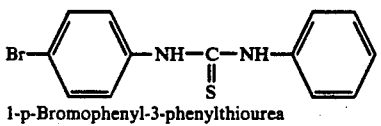
1-p-Bromophenyl-3-phenylthiourea

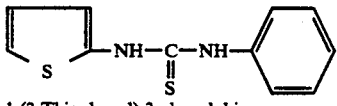
1-(2-Thiophenyl)-3-phenylthiourea

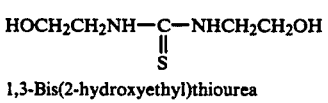
1,3-Bis(2-hydroxyethyl)thiourea

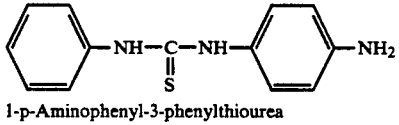
1-p-Aminophenyl-3-phenylthiourea

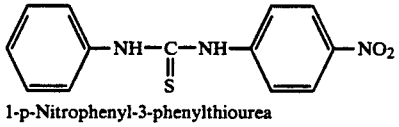
1-p-Nitrophenyl-3-phenylthiourea

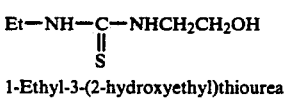
1-Ethyl-3-(2-hydroxyethyl)thiourea

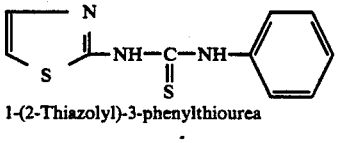
1-(2-Thiazolyl)-3-phenylthiourea

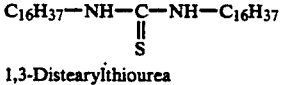
1,3-Distearylthiourea

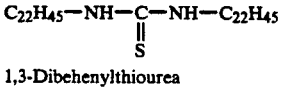
1,3-Dibehenylthiourea

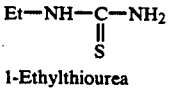
1-Ethylthiourea

The copper compound of this invention is at least one compound selected from the group consisting of a compound of the general formula (II), copper acetylacetonate, chlorophyll-copper, chlorophyllin-copper and copper hydroxide.

$$(R-X)_nCu \qquad (II)$$

wherein R represents a hydrogen atom, an alkyl group, a cycloalkyl group, an aryl group, an aralkyl group or a heterocyclic group (said group may have at least one substituent); and X represents —COO, —SO$_4$, —SO$_3$, —PO$_4$ or —O; n represents an integer of 1 to 4.

The compounds of the general formula (II) are not particularly limited and include, for example, copper stearate, copper palmitate, copper oleate, copper behenate, copper laurate, copper caprate, copper caproate, copper valerate, copper isolactate, copper lactate, copper propionate, copper acetate, copper formate, copper hydroxide, copper benzoate, copper o-toluylate, copper m-toluylate, copper p-toluylate, copper para-tertiarybutylbenzoate, copper o-chlorobenzoate, copper m-chlorobenzoate, copper p-chlorobenzoate, copper dichlorobenzoate, copper trichlorobenzoate, copper p-bromobenzoate, copper p-iodobenzoate, copper p-phenylbenzoate, copper o-benzoylbenzoate, copper p-nitrobenzoate, copper anthranilate, copper p-aminobenzoate, copper oxalate, copper malonate, copper succinate, copper glutarate, copper adipate, copper pimelate, copper suberate, copper azelate, copper sebacinate, copper phthalate, copper monoesterphthalate, copper naphthenate, copper naphthalene carboxylate, copper tartarate, copper diphenylamine-2-carboxylate, copper 4-cyclohexyllactate, copper diethyldithiocarbamate, copper gluconate, diethoxy copper, di-isopropoxy copper, di-n-butoxy copper, copper octylate, copper alkylbenzene sulfonate, copper p-toluene sulfonate, copper naphthalene sulfonate, copper naphthylamine sulfonate, copper n-dodecylbenzene sulfonate, copper dodecyl sulfate, copper 2,5-dimethylbenzene sulfonate, copper 2-carbomethoxy-5-methylbenzene sulfonate, copper α-naphthylphosphate, copper stearylphosphate, copper laurylphosphate, copper di-2-ethylhexylphosphate, copper isodecylphosphate and the like.

The above thiourea compound and the copper compound absorb almost no rays of near IR-region, or, even if the absorption occurred, only light ray of a particular wave length is absorbed. The heating of one of the thiourea compound and the copper compound has no substantial effect on the near IR-absorbency. However, an admixture of the thiourea compound and the above copper compound, if heated, causes a near IR-absorption uniformly and strongly. In this case, a strongly near IR-absorption does not occur without heat-treatment, even using the thiourea compound of the general formula (I) together with a compound of the general formula (II), copper acetylacetonate, chlorophyll-copper and chlorophyllin-copper.

One of the above thiourea compound and the copper compound absorb almost no rays of near IR-region, or even if the absorption occurred, light ray of a particular wave length is absorbed. The heating of one of the thiourea compound and the copper compound has no substantial effect on the near IR-absorbency. However, an admixture of the thiourea compound and the above copper compound, if heated, causes a near IR-absorption uniformly and strongly. In this case, a strongly near IR-absorption does not occur without heat-treatment, even using the thiourea compound of the general formula (I) together with at least one compound of the general formula (II), copper acetylacetonate, chlorophyll-copper and chlorophyllin-copper.

A transparent plate is prepared by heating both the raw material of a polymer and the composition of the present invention. The obtained plate has the advantages that it transmits visible rays and shields near IR-rays through their absorption.

Since the transparent plate of this invention containing the thiourea compound and the copper compound exhibits a high absorbency in the entire near IR-region, it can be used as an equipment detecting near IR-rays, thermic ray shielding-materials for car ports, exterior substances and the like.

The degree of the near IR-absorbency can be adjusted by controlling a kind and an addition (per polymer) of the thiourea compound and the copper compound, a heating temperature, a heated time, etc.

The plate of this invention is prepared, for example, as follows.

Transparent pellets which are capable of absorbing near IR-rays are prepared by mixing the composition and the transparent thermoplastic resin, such as polymethacrylic resin, polycarbonate, polyethylene, vinyl chloride, etc. By extrusion-molding the transparent pellets, a transparent near IR-absorbing film or plate is obtained.

The composition of this invention is preferably 0.01–3%, most preferably 0.1–1%, based on the raw material of the transparent polymer.

This transparent plate is prepared by mixing both the raw material of transparent polymer and the compositions of this invention and then by heating the mixed materials.

The product of this invention is prepared in form of plate or bar by a usually known method, for example, by heat-molding pellets produced from both the thermoplastic resin and the composition of this invention.

The heating method for obtaining a near IR-absorbency is not particular limited. There may be used various heating methods, in which a reaction between a thiourea compound and a copper compound occurs for obtaining a near IR-absorbency. Means for the heating method include, for example, electric heaters, induction-heaters, extruders for plates, and the like.

The heat-treatment is carried out under ambient atmosphere, for example, under usual atmosphere, inactive gas atmosphere, commonly in the cylinder of extrusion-molding machine.

The heating temperature used in this invention is in the range of 40–400° C., preferably 100–350° C. The heating time is in the range of 1 second to several minutes.

The rapid reaction and the uniform mixing owing to a superior heat-transfer by increasing a mutual contact of substances by means of the agitation, rotation and pressure in the extrusion machine are preferable.

The raw materials of polymers include, for example, the transparent raw materials of polymethacrylate, polycarbonate, polystyrol, polyvinylchloride, polyethylene, polyester and the like. Among the above materials, the raw materials of polymethacrylate and polycarbonate are most preferable.

The transparent plate of this invention is a plate transmitting more than 20% of visible rays. In this invention, various types of plates can be produced by selecting an appropriate die in extrusion-molding.

The transparent plate of this invention includes, for example, usual plate, film, sheet and the like.

The transparent plate of this invention is selected appropriately and has a thickness of 0.1–30 mm. With a thick plate, the mixing ratio of the thiourea compound to the copper compound is lowered.

The vapor-deposited layer on the plate provides a superior thermic rays-cutting effect.

As metal to be deposited, aluminum, gold, chromium, gold alloy, copper, and platinum are preferable. Among them, aluminum is most preferable.

Further, the sheet of this invention is prepared by applying onto a substrate the dispersed slurry of the composition by means of a spraying-machine, a coater, a printer and the like.

The substrate of this invention includes, for example, paper, film, foil and the like. Papers are preferably used since they are easily coated with the composition of this invention. Examples of the papers of this invention include wood-containing papers, fine papers, coated papers, synthetic papers, laminated papers in which a paper is laminated or coated with plastic polymer, e.g. polypropylene, polyethylene, etc. Among them, fine papers, coated papers and synthetic papers are preferable.

Examples of the film of this invention include plastic films such as polyethylene film, polyester film, polyvinyl chloride film, etc. Among them, heat-resistant films, such as polyester, are preferable. Examples of the foil of this invention include aluminum foil, etc.

The substrate of this invention can be used in various forms. For example, the base sheet of this invention comprises a sheet produced by, for example, the lamination of several plies of paper, the lamination of plastic film or foil to a paper.

And the sheet of this invention comprises the sheet produced by, for example, the following process: The substrate is coated with the composition of this invention, laminated with a paper and finally coated with the composition of this invention.

The heating method for obtaining a near IR-absorbency is not particularly limited. There may be used various heating methods, in which a reaction between a thiourea compound and a copper compound occurs for obtaining a near IR-absorbency.

As described, it is preferred that the admixture of the thiourea compound and the copper compound used in this invention is an admixture of the thiourea compound of the general formula (I) and the copper compound of the general formula (II), copper acetyl-acetonate, chlorophyl-copper, chlorophyllin-copper and copper hydroxide.

The above admixture absorbs the rays of entire near IR-region of 700–2,000 nm uniformly and strongly.

The reason for this fact is not clear. As is apparent from Examples and Comparative Examples, the heating of one of the thiourea compound and the copper compound does not cause the entire near IR-absorption in the region of 700–2,000 nm uniformly and strongly, and the mixing of the thiourea compound and the copper compound without heating provides the same result. Accordingly, it is assumed that the heating of the admixture of this invention causes a reaction between the thiourea compound and the copper compound, thereby forming a complex. [Examples]

The following examples illustrate this invention, although this invention is not limited to Examples. The parts are parts by weight.

EXAMPLE 1

0.4 weight-parts of 1,3-diphenylthiourea and 0.2 weight-parts of copper stearate were added to 100 weight-parts of polymethacrylic resin (manufactured by Mitsubishi Rayon Co., Ltd., ACRYPET) to prepare a dry blended resin. The dry blended resin was extruded in form of string from an extruder (cylinder temperature: 240° C.), was cooled and cut to prepare near IR-absorbing pellets. With extrusion-molding, a plate of 2 mm thickness was obtained.

The obtained plate shielded the UV-rays of 240–350 nm and the near IR-rays of 900–2,000 nm, transmitted circa 60% of visible rays, and is superior as thermic ray shielding material for exterior product.

EXAMPLE 2

0.4 weight-parts of 1,3-Di-m-chlorophenylthiourea and 0.2 weight-parts of copper laurate were added to 100 weight-parts of polymethacrylic resin (manufactured by Sumitomo Kagaku Co., SUMIPET) to prepare dry blended resin. The dry blended resin was extruded in form of string from an extruder (cylinder temperature: 240° C.), was cooled and cut to prepare near IR-absorbing pellets. With extrusion-molding, a plate of 2 mm thickness was obtained.

The obtained plate shielded the UV-rays of 240–350 nm and 85% of the near IR-rays of 900–2,000 nm.

EXAMPLE 3

0.4 weight-parts of 1,3-diphenylthiourea and 0.2 weight-parts of acetyl acetonate were added to 100 weight-parts of polycarbonate (manufactured by Idemitsu Oil Chemical Co., TOUGHLON IR-2500° A) to prepare a dry blended resin. The dry blended resin was extruded in form of string from an extruder (cylinder temperature: 280° C.), was cooled and cut to prepare near IR-absorbing pellets. With extrusion-molding, a plate of 2 mm thickness was obtained.

The obtained plate blocked circa 100% of UV-rays, transmitted circa 60% of visible rays and shielded 80% of near IR-rays.

EXAMPLE 4

0.4 weight-parts of 1,3-dibutylthiourea and 0.3 weight-parts of copper stearate were added to 100 weight-parts of polystyrol Near IR-absorbing pellets were prepared in the same manner as in Example 3. With extrusion-molding, a plate of 2 mm thickness was obtained.

The obtained plate blocked circa 95% of UV-rays of 240–350 nm, transmitted circa 60% of visible rays and shielded 82% of near IR-rays of 900–2,000 nm.

COMPARATIVE EXAMPLE 1

0.4 weight-parts of 1,3-diphenylthiourea were added to 100 weight-parts of polymethacrylic resin (manufactured by Mitsubishi Rayon Co., Ltd., ACRYPET). In the same manner, a plate of 2 mm thickness was obtained by using extrusion-molding.

The obtained plate absorbed almost no near IR-rays and had no function as thermic rays-shielding materials for exterior substances.

COMPARATIVE EXAMPLE 2

0.2 weight-parts of copper stearate were added thereto instead of using diphenylthiourea in Comparative Example 1.

In the same manner as in Comparative Example 1, a plate of 2 mm thickness was obtained by using extrusion-molding.

The obtained plate absorbed almost no near IR-rays, as in Comparative Example 1, and had no function as thermic rays-shielding materials for exterior substances.

EXAMPLE 5

Each of liquid A (containing the thiourea compound) and liquid B (containing the copper compound shown in No. 1, 3 and 5 of Table 1) was ground to an average particle size of circa 3 μ by an attritor.

| Liquid A | | |
|---|---|---|
| Thiourea compound of No. 1, 3 or 5 | | 20 parts |
| 10% aqueous solution of polyvinyl alcohol | | 50 parts |
| Water | | 30 parts |
| | Total | 100 parts |
| Liquid B | | |
| Copper compound No. 1, 3 or 5 | | 20 parts |
| 10% aqueous solution of polyvinyl alcohol | | 50 parts |
| Water | | 30 parts |
| | Total | 100 parts |

50 parts of liquid A and 50 parts of liquid B were mixed to prepare a coating material. The coating material was applied on the side of a wood free paper weighing 60 g/m² at a coating weight of 5 g/m² by means of a meyer-bar and then dried. In this manner, a recording paper was obtained.

Any of the recording sheets is white to pale blue and forms a pale brownish-green color in contact with a metal block having a surface temperature of 150° C. for 5 seconds.

At each colored part, the near IR-absorption values of 800, 900, 1000, 1500 and 2,000 nm wave lengths are high, i.e. they are more than 80% on an average.

A thermo-sensitive printing was made by means of a thermal-sensitive bar code printer (BW-100T, manufactured by Mekano System Co., Ltd.). In any case, a pale brownish-green bar-code pattern was obtained. This pattern is clearly readable by means of a bar-code reader (MS-Ba-Dec 230, manufactured by Mekano System Co., Ltd.) in which a semiconductor laser having a near IR-wave length of 940 nm is used as a reading means.

EXAMPLE 6

In accordance with the Combination Nos. 1–23 in Table 1, 5 parts of a thiourea compound and 5 parts of a copper compound were charged in a porcelain crucible to prepare an admixture.

10 parts of the admixture was heat-treated at 150° C. for 15 seconds in an electric furnace. The obtained pale-colored reaction-product (powder) was fixed in a certain thickness on a fine paper.

The reflectance of the surface was measured by a spectrophotometer (UVID EC-590, manufactured by Japan Spectroskopic Co., Ltd.), with regard to the reflection spectrum of the near IR-region of 800–2,500 nm wave length.

A near IR-absorbency is illustrated as an average near IR-absorption value, wherein the near IR-absorption value is a difference between 100% and a reflectance at each wave length of 800, 900, 1000, 1500 and 2,000 nm. In this case, ⊙ indicates an average value of at least 80%, o indicates an average value of at least 60%, Δ indicated an average value of at least 30%, x indicates an average value of less than 30%. The near IR-absorbing material of this invention means a material having an average value of at least 30%. The average IR-absorbency of the reaction-substances in Nos. 1–23 of Table 1 indicates a value of at least 60%.

COMPARATIVE EXAMPLE 3

Each of thiourea compounds or copper compounds in Table 2 was heat-treated under the same conditions as in Example 2 to prepare a heated sheet.

The near IR-reflection spectrum of the heated sheet was measured, and the near IR-absorbency was evaluated. All of the near IR-absorbencies are less than 30%, as seen in Table 2.

Further, the comparison of a separate heating, a mixing, and a combined heating of the thiourea compound and the copper compound used in this invention are explained in FIG. 1. In FIG. 1, 1,3-dipheylthiourea is used as the thiourea compound of this invention, and copper p-chlorobenzoate is used as the copper compound of this invention, wherein, Nos. 1 and 4 of Comparative Example 1 as a separate heating, No. 1 of Example 1 as a mixing, and No. 1 of Example 2 as a combined heating are compared, in regard to the near IR-reflection spectra in the region of 800–2,000 nm.

From FIG. 1, it is clear that the near IR-absorbency of Example 2, No. 1 in the combined heating of 1,3-diphenylthiourea and copper p-chlorobenzoate is remarkably higher than the near IR-absorbency in heating without mixing or in mixture without heating; i.e. the near IR-absorbency of Example 2, No. 1 indicates more than 90% in the entirely measured wave lengths.

TEST METHODS

Color of Background

The reflectance of the coated surface after heat-treatment is measured by a Macbeth densitometer (RD-914, using an amber filter).

Stability Against Heat

A sheet is allowed to stand in an oven at 60° C. for 24 hours, and then the IR-reflectance is measured by a spectrophotometer (using a wave length of 1000 nm). The stability against heat is evaluated as a residual rate of near IR-absorbency from the following equation.

$$\text{Residual rate} = \frac{100 - \text{Reflectance after heat-treatment}}{100 - \text{Reflectance beforheat-treatment}} \times 100(\%)$$

Stability Against Humidity

A sheet is allowed to stand under the condition of 40° C. and 90% RH. After 24 hours, a near infrared reflectance of the sheet is measured by a spectrophotometer (using a wave length of 1,000 nm). Stability against humidity is evaluated as a residual rate of near IR-absorbency from the following equation.

$$\text{Residual rate} = \frac{100 - \text{Reflectance after storage under the humidic condition}}{100 - \text{Reflectance before storage}} \times 100(\%)$$

Stability Against Light

A sheet is subjected to light-irradiation for 6 hours by means of a fade-O-meter (using a wave length of 1,000 nm). Stability against light is evaluated as a residual rate of near IR-absorbency from the following equation.

Residual rate =

$$\frac{100 - \text{Reflectance after light irradiation}}{100 - \text{Reflectance before light irradiation}} \times 100(\%)$$

TABLE 1

| | Thiourea compound | Lead compound | Mixing ratio | Near IR-Absorbency | Heat-treatment |
|---|---|---|---|---|---|
| No. 1 | 1,3-Diphenylthiourea | copper p-chlorobenzoate | 1:1 | ⊚ | Heat-treatment |
| No. 2 | 1,3-Diphenylthiourea | copper p-chlorobenzoate | 1:1 | ⊚ | Heat-treatment |
| No. 3 | 1,3-Diphenylthiourea | copper p-chlorobenzoate | 1:1 | ⊚ | Heat-treatment |
| No. 4 | 1,3-Diphenylthiourea | copper p-chlorobenzoate | 1:1 | ⊚ | Heat-treatment |
| No. 5 | 1,3-Di-m-chlorophenylthiourea | copper p-chlorobenzoate | 1:1 | ⊚ | Heat-treatment |
| No. 6 | 1,3-Diphenylthiourea | Leadstearate | 1:1 | ⊚ | Heat-treatment |
| No. 7 | 1,3-Diphenylthiourea | Leadbehenate | 1:1 | ⊚ | Heat-treatment |
| No. 8 | 1,3-Diphenylthiourea | copper p-nitrobenzoate | 1:1 | ⊚ | Heat-treatment |
| No. 9 | 1,3-Diphenylthiourea + 1,3-Dichlorothiourea | copper p-chlorobenzoate | (0.6:0.6):1 | ⊚ | Heat-treatment |
| No. 10 | 1,3-Diphenylthiourea | copper p-bromobenzoate | 1:1 | ⊚ | Heat-treatment |
| No. 11 | 1,3-Diphenylthiourea | Leadbenzoate | 1:1 | ○ | Heat-treatment |
| No. 12 | 1,3-Diphenylthiourea | copperbenzoate | 1:1 | ○ | Heat-treatment |
| No. 13 | 1,3-Diphenylthiourea | Chlorophyll-Lead | 1:1 | ○ | Heat-treatment |
| No. 14 | 1,3-Diphenylthiourea | copper gluconate | 1:1 | ○ | Heat-treatment |
| No. 15 | 1,3-Diphenylthiourea | copper 4-cyclohexyllactate | 1:1 | ○ | Heat-treatment |
| No. 16 | 1,3-Diphenylthiourea | copper n-dodecylbenzolsulfonate | 1:1 | ○ | Heat-treatment |
| No. 17 | 1,3-Diphenylthiourea | Leadnaphthalene sulfonte | 1:1 | ○ | Heat-treatment |
| No. 18 | 1,3-Diphenylthiourea | copper α-naphthlphosphate | 1:1 | ○ | Heat-treatment |
| No. 19 | 1,3-Diphenylthiourea | copper stearate + copper p-chlorobenzoate | 1:(0.5:0.5) | ○ | Heat-treatment |
| No. 20 | 1,3-Diphenylthiourea | copper stearylphosphate | 1:1 | ○ | Heat-treatment |
| No. 21 | 1,3-Diphenylthiourea | copper acetate | 1:1 | ○ | Heat-treatment |
| No. 22 | 1,3-Diphenylthiourea | copper succinate | 1:1 | ○ | Heat-treatment |
| No. 23 | 1,3-Diphenylthiourea | copper glutarate | 1:1 | ○ | Heat-treatment |

TABLE 2

| | Thiourea compound | Lead compound | Mixing ratio | Near IR-Absorbency | Heat-treatment |
|---|---|---|---|---|---|
| No. 1 | 1,3-Diphenylthiourea | — | 1:0 | X | Heat-treatment |
| No. 2 | 1,3-Dilaurylthiourea | — | 1:0 | X | Heat-treatment |
| No. 3 | 1,3-Di-m-chlorophenylthiourea | — | 1:0 | X | Heat-treatment |
| No. 4 | — | copper p-chlorobenzoate | 0:1 | X | Heat-treatment |
| No. 5 | — | copper behenate | 0:1 | X | Heat-treatment |
| No. 6 | — | copper stearate | 0:1 | X | Heat-treatment |

We claim:

1. A plate which is capable of absorbing near IR-rays which is prepared by heating at least a transparent polymer and a mixture of at least one thiourea compound of the general formula (I)

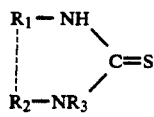

$$\begin{array}{c} R_1-NH \\ | \\ | \\ R_2-NR_3 \end{array} \diagdown C=S \qquad (I)$$

wherein $R_1$, $R_2$ and $R_3$ are the same or different, and represent a hydrogen atom, an alkyl group of from 1 to about 22 carbon atoms, a cyclohexyl group, a phenyl group, a chlorophenyl group, a methoxyphenyl group, a benzyl group, a phenethyl group, a nitrophenyl group, an aminophenyl group, an hydroxyphenyl group, a bromophenyl group, a thienyl group, a thiazolyl group, or an hydroxyethyl group; or $R_1$, $R_2$ and $R_3$ taken together with each other may form a ring, and at least one copper compound selected from the group consisting of copper acetylacetonate, chlorophyll-copper, chlorophyllin-copper and a compound of the general formula (II)

$$(R-X)_n Cu \qquad (II)$$

wherein R represents a hydrogen atom, an alkyl group of up to about 22 carbon atoms and which may be substituted by from 1 to about six hydroxyl grups or by a carboxyl group, an alkylene group of up to about 17 carbon atoms, a cyclohexyl group, a phenyl group, a phenyl group substituted with an alkyl group having from 1 to about 12 carbon atoms, phenylamine, phenyl, benzoyl, $NH_2$, or carbomethoxy, or a naphthyl group, and X represents $-COO$, $-SO_4$, $-SO_3$, $-PO_4$, or $-O$; and n is an integer of 1 to 2, and wherein said copper compound does not substantially absorb rays of near IR region, and said mixture, when heated, absorbs rays of near IR region.

2. The plate according to claim 1, wherein said copper compound is copper acetylacetonate.

3. The plate according to claim 1, wherein said copper compound is at least one compound selected from the group consisting of chlorophyll-copper, chlorophyllin-copper and copper hydroxide.

4. The plate according to claim 1, wherein said plate is a film.

5. The plate according to claim 1, wherein said transparent polymer is at least one polymer selected from the group consisting of polymethacrylate, polycarbonate, polystyrol, polyvinylchloride, polyethylene and polyester.

6. The plate according to claim 1, wherein a vapor-deposited layer is further located on a said plate.

7. A sheet comprising a substrate having deposited thereon a composition which upon heating is capable of absorbing near IR-rays and comprises a mixture of at least one thiourea compound of the general formula (I)

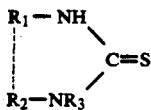

wherein $R_1$, $R_2$ and $R_3$ are the same or different, and represent a hydrogen atom, an alkyl group of from 1 to about 22 carbon atoms, a cyclohexyl group, a phenyl group, a chlorophenyl group, a methoxyphenyl group, a benzyl group, a phenethyl group, a nitrophenyl group, an aminophenyl group, an hydroxyphenyl group, a bromophenyl group, a thienyl group, a thiazolyl group, or an hydroxyethyl group; or $R_1$, $R_2$ and $R_3$ taken together with each other may form a ring,
and at least one copper compound selected from the group consisting of copper acetylacetonate, chlorophyll-copper, chlorophyllin-copper and a compound of the general formula (II)

wherein R represents a hydrogen atom, an alkyl group of up to about 22 carbon atoms and which may be substituted by from 1 to about six hydroxyl groups or by a carboxyl group, an alkylene group of up to about 17 carbon atoms, a cyclohexyl group, a phenyl group, a phenyl group substituted with an alkyl group having from 1 to about 12 carbon atoms, phenylamine, phenyl, benzoyl, $NH_2$, or carbomethoxy, or a naphthyl group, and X represents $-COO$, $-SO_4$, $-SO_3$, $-PO_4$, or $-O$; and n is an integer of 1 to 2,
and wherein said copper compound does not substantially absorb rays of near IR region, and said mixture, when heated, absorbs rays of near IR region.

8. The sheet according to claim 7, wherein said copper compound is copper acetylacetonate.

9. The sheet according to claim 7, wherein said copper compound is at least one compound selected from the group consisting of chlorophyll-copper, chlorophyllin-copper and copper hydroxide.

10. The sheet according to claim 7, wherein said substrate is at least one member selected from the group consisting of paper, film and foil.

11. The sheet according to claim 7, wherein said substrate is paper.

12. The sheet according to claim 11, wherein said paper is at least a paper selected from the group consisting of wood-containing papers, fine papers, coated papers, synthetic papers and laminated papers.

13. The sheet according to claim 10, wherein said substrate is a plastic film.

14. The sheet according to claim 10, wherein said substrate is an aluminum foil.

15. The plate according to claim 1, wherein said copper compound is at least one compound of said general formula (II).

16. The plate according to claim 1, wherein the amount of said mixture is 0.01 to 3% by weight of said transparent polymer.

17. The sheet according to claim 7, wherein said copper compound is at least one compound of said general formula (II).

18. The plate according to claim 1 wherein said plate transmits at least 20% of visible rays.

19. The plate according to claim 1 wherein said plate has a thickness in the range of from 0.1 to 30 mm.

20. The plate according to claim 1 in which the weight ratio of said thiourea compound to said copper compound is in the range of from 1:1 to 2:1.

21. The plate according to claim 1 wherein said plate uniformly absorbs rays having wavelengths in the range of from 700 to 2,000 nm.

22. A plate which is capable of absorbing near IR-rays which is prepared by heating at least a transparent polymer and a mixture of at least one thiourea compound of the general formula (I)

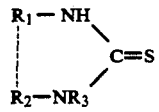

wherein $R_1$, $R_2$ and $R_3$ are the same or different, and represent a hydrogen atom, an alkyl group of from 1 to about 22 carbon atoms, a cyclohexyl group, a phenyl group, a chlorophenyl group, a methoxyphenyl group, a benzyl group, a phenethyl group, a nitrophenyl group, an aminophenyl group, an hydroxyphenyl group, a bromophenyl group, a thienyl group, a thiazolyl group, or an hydroxyethyl group; or $R_1$, $R_2$ and $R_3$ taken together with each other may form a ring,
and at least one copper compound selected from the group consisting of copper acetylacetonate, chlorophyll-copper, chlorophyllin-copper, copper stearate, copper palmitate, copper oleate, copper behenate, copper laurate, copper caprate, copper caproate, copper valerate, copper isolactate, copper lactate, copper propionate, copper acetate, copper formate, copper hydroxide, copper benzoate, copper o-toluylate, copper m-toluylate, copper p-toluylate, copper para-tertiarybutylbenzoate, copper o-chlorobenzoate, copper m-chlorobenzoate, copper p-chlorobenzoate, copper dichlorobenzoate, copper trichlorobenzoate, copper p-bromobenzoate, copper p-iodobenzoate, copper p-phenylbenzoate, copper o-benzoylbenzoate, copper p-nitrobenzoate, copper anthranilate, copper p-aminobenzoate, copper oxalate, copper malonate, copper succinate, copper glutarate, copper adipate, copper pimelate, copper suberate, copper azelate, copper sebacinate, copper phthalate, copper monoesterphthalate, copper naphthenate, copper naphthalene carboxylate, copper tartarate, copper diphenylamine-2-carboxylate, copper 4-cyclohexyllactate, copper diethyldithiocarbamate, copper gluconate, diethoxy copper, di-isopropoxy copper, di-n-butoxy copper, copper octylate, copper p-toluene sulfonate, copper naphthalene sulfonate, copper naphthylamine sulfonate, copper n-dodecylbenzene sulfonate, copper dodecyl sulfate, copper 2,5-dimethylbenzene sulfonate, copper 2-carbomethoxy-5-methylbenzene sulfonate, copper α-naphthylphosphate, copper stearylphosphate, copper laurylphosphate, copper di-2-ethylhexylphosphate and copper isodecylphosphate.

23. A sheet comprising a substrate having deposited thereon a composition which upon heating is capable of absorbing near IR-rays and comprises a mixture of at least one thiourea compound of the general formula (I)

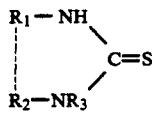

wherein $R_1$, $R_2$ and $R_3$ are the same or different, and represent a hydrogen atom, an alkyl group of from 1 to about 22 carbon atoms, a cyclohexyl group, a phenyl group, a chlorophenyl group, a methoxyphenyl group, a benzyl group, a phenethyl group, a nitrophenyl group, an aminophenyl group, an hydroxyphenyl group, a bromophenyl group, a thienyl group, a thiazolyl group, or an hydroxyethyl group; or $R_1$, $R_2$ and $R_3$ taken together with each other may form a ring, and at least one copper compound selected from the group consisting of copper acetylacetonate, chlorophyll-copper, chlorophyllin-copper, copper stearate, copper palmitate, copper oleate, copper behenate, copper laurate, copper caprate, copper caproate, copper valerate, copper isolactate, copper lactate, copper propionate, copper acetate, copper formate, copper hydroxide, copper benzoate, copper o-toluylate, copper m-toluylate, copper p-toluylate, copper para-tertiarybutylbenzoate, copper o-chlorobenzoate, copper m-chlorobenzoate, copper p-chlorobenzoate, copper dichlorobenzoate, copper trichlorobenzoate, copper p-bromobenzoate, copper p-iodobenzoate, copper p-phenylbenzoate, copper o-benzoylbenzoate, copper p-nitrobenzoate, copper anthranilate, copper p-aminobenzoate, copper oxalate, copper malonate, copper succinate, copper glutarate, copper adipate, copper pimelate, copper suberate, copper azelate, copper sebacinate, copper phthalate, copper monoesterphthalate, copper naphthenate, copper naphthalene carboxylate, copper tartarate, copper diphenylamine-2-carboxylate, copper 4-cyclohexyllactate, copper diethyldithiocarbamate, copper glyconate, diethoxy copper, di-isopropoxy copper, di-n-butoxy copper, copper octylate, copper p-toluene sulfonate, copper naphthalene sulfonate, copper naphthylamine sulfonate, copper n-dodecylbenzene sulfonate, copper dodecyl sulfate, copper 2,5-dimethylbenzene sulfonate, copper 2-carbomethoxy-5-methylbenzene sulfonate, copper α-naphthylphosphate, copper stearylphosphate, copper laurylphosphate, copper di-2-ethylhexylphosphate and copper isodecylphosphate.

24. The plate of claim 7 wherein the thiourea compound of formula (I) is selected from the group consisting of 1-ethyl-3-phenylthiourea, 1,3-diphenylthiourea, 1,3-diethylthiourea, 1-ethyl-3-p-chlorophenylthiourea, 1,3-dicyclohexylthiourea, 1-phenyl-3-p-chlorophenylthiourea, 1-phenyl-3-p-methoxyphenylthiourea, 1,1-diphenylthiourea, 1,1-dibenzyl-3-phenethylthiourea, 1-phenyl-3-(2-hydroxyethyl)thiourea, 1-phenylthiourea, 1-m-nitrophenylthiourea, 1-p-nitrophenylthiourea, 1-p-aminophenylthiourea, 1,3-dimethylthiourea, 1-p-hydroxyphenyl-3-phenylthiourea, 1,3-di-m-chlorophenylthiourea, ethylenethioureau, thiourea, 1-methyl-3-p-hydroxyphenylthiourea, 1-p-bromophenyl-3-phenylthiourea, 1-(2-thiophenyl)-3-phenylthiourea, 1,3-bis(2-hydroxyethyl)thiourea, 1-p-aminophenyl-3-phenylthiourea, 1-p-nitrophenyl-3-phenylthiourea, 1-ethyl-3-(2-hydroxyethyl)thiourea, 1-(2-thizaolyl)-3-phenylthiourea, 1,3-distearylthiourea, 1,3-dibehenylthiourea, and 1-ethylthiourea.

25. The sheet of claim 22 wherein the thiourea compound of formula (I) is selected from the group consisting of 1-ethyl-3-phenylthiourea, 1,3-diphenylthiourea, 1,3-diethylthiourea, 1-ethyl-3-p-chlorophenylthiourea, 1,3-dicyclohexylthiourea, 1-phenyl-3-p-chlorophenylthiourea, 1-phenyl-3-p-methoxyphenylthiourea, 1,1-diphenylthiourea, 1,1-dibenzyl-3-phenethylthiourea, 1-phenyl-3-(2-hydroxyethyl)thiourea, 1-phenylthiourea, 1-m-nitrophenylthiourea, 1-p-nitrophenylthiourea, 1-p-aminophenylthiourea, 1,3-dimethylthiourea, 1-p-hydroxyphenyl-3-phenylthiourea, 1,3-di-m-chlorophenylthiourea, ethylenethiourea, thiourea, 1-methyl-3-p-hydroxyphenylthiourea, 1-p-bromophenyl-3-phenylthiourea, 1-(2-thiophenyl)-3-phenylthiourea, 1,3-bis(2-hydroxyethyl)thiourea, 1-p-aminophenyl-3-phenylthiourea, 1-p-nitrophenyl-3-phenylthiourea, 1-ethyl-3-(2-hydroxyethyl)thiourea, 1-(2-thizaolyl)-3-phenylthiourea, 1,3-distearylthiourea, 1,3-dibehenylthiourea, and 1-ethylthiourea.

* * * * *